Sept. 12, 1933. W. E. BEAZLEY Re. 18,944

POWER OPERATED LAWN MOWER

Original Filed June 15, 1929 3 Sheets-Sheet 1

William E. Beazley,
INVENTOR

BY Victor J. Evans
ATTORNEY

Sept. 12, 1933. W. E. BEAZLEY Re. 18,944

POWER OPERATED LAWN MOWER

Original Filed June 15, 1929 3 Sheets-Sheet 2

William E. Beazley,
INVENTOR

BY Victor J. Evans
ATTORNEY

Sept. 12, 1933. W. E. BEAZLEY Re. 18,944
POWER OPERATED LAWN MOWER
Original Filed June 15, 1929 3 Sheets-Sheet 3
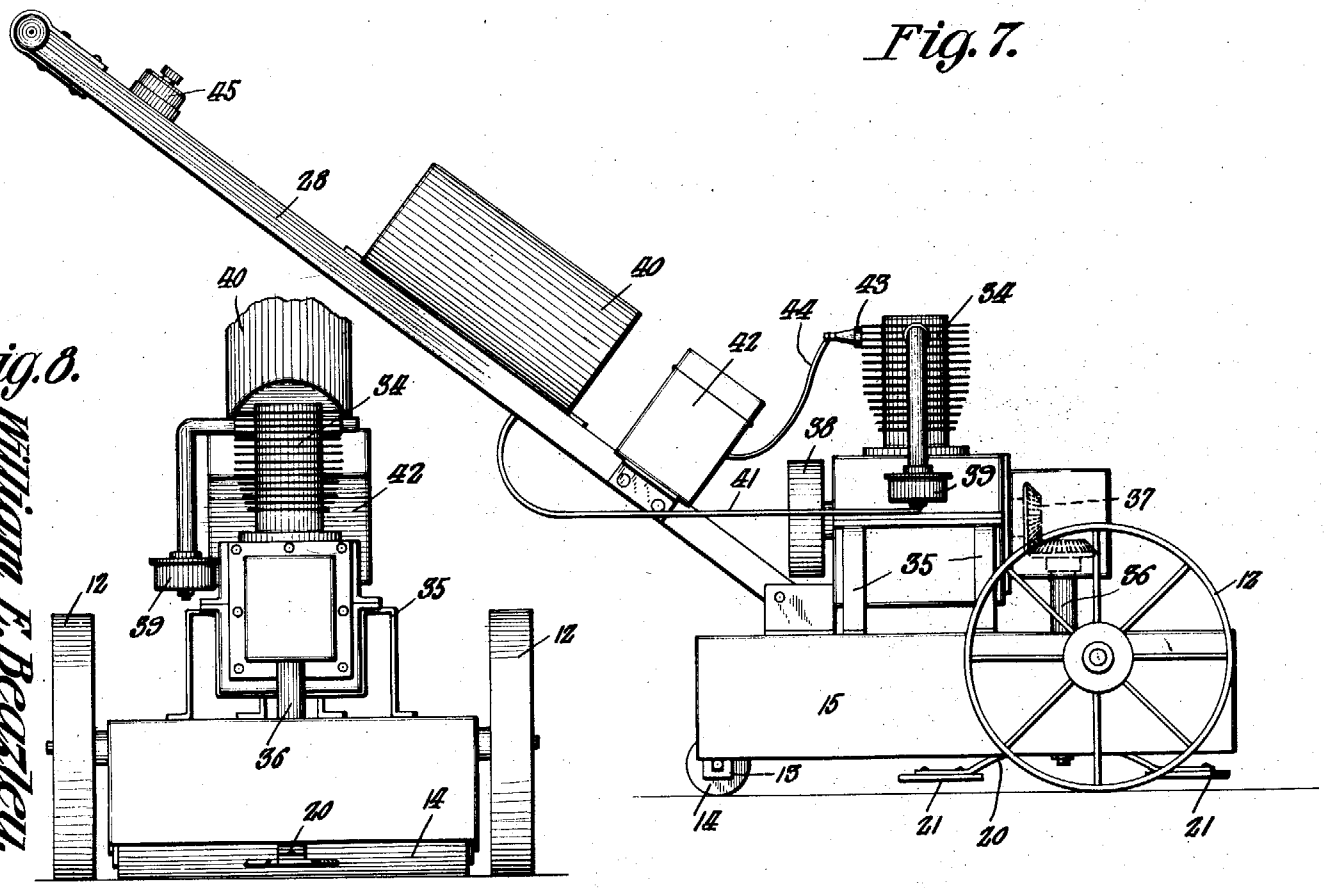
William E. Beazley,
INVENTOR
BY Victor J. Evans
ATTORNEY Reissued Sept. 12, 1933

Re. 18,944

UNITED STATES PATENT OFFICE 18,944

POWER OPERATED LAWN MOWER

William E. Beazley, St. Petersburg, Fla., assignor to Beazley Power Mower Co. (Incorporated), St. Petersburg, Fla.

Original No. 1,827,559, dated October 13, 1931, Serial No. 371,232, June 15, 1929. Application for reissue August 6, 1932. Serial No. 627,804

7 Claims. (Cl. 56—25)

This invention relates to lawn mowers and more particularly to an improvement in power operated mowers characterized by the provision of horizontally rotatable cutting means together with air advancing means for raising the grass or the like up into the field of action of the cutting means.

The invention resides principally in the particular manner of combining the cutting means and air advancing means with their power drive and with a housing so constituted as to define a confined air space open at its bottom adjacent the ground whereby air is advanced upwardly from the ground in the region of the cutting means through the bottom opening of the housing and past the path of movement of said cutting means to draw the grass upwardly and into the field of action of the cutting means. The cutting means is so constituted and so combined in the structure as to exert an effective and efficient cutting action.

Another object of the invention resides in the provision of a simple, efficient and easily handled power driven mower which may be operated at a low cost.

Another object of the invention is the provision of a mower having novel means for holding the blades of grass and other vegetation in an erect position to be acted upon by the cutting blades of the mower, so that the grass will be cut to a uniform height.

Another object of the invention is the provision of means for adjusting the cutters to regulate the height of the cut.

Other objects and advantages reside in certain novel features of the construction, arrangement and combination of parts which will be hereinafter more fully described and particularly pointed out in the appended claims, reference being had to the accompanying drawings, and forming a part of this specification, and in which:

Figure 7 is a side view showing a slightly different form of the invention; and

Figure 8 is a front view of the mower shown in Figure 7.

Figures 1, 2, 5:
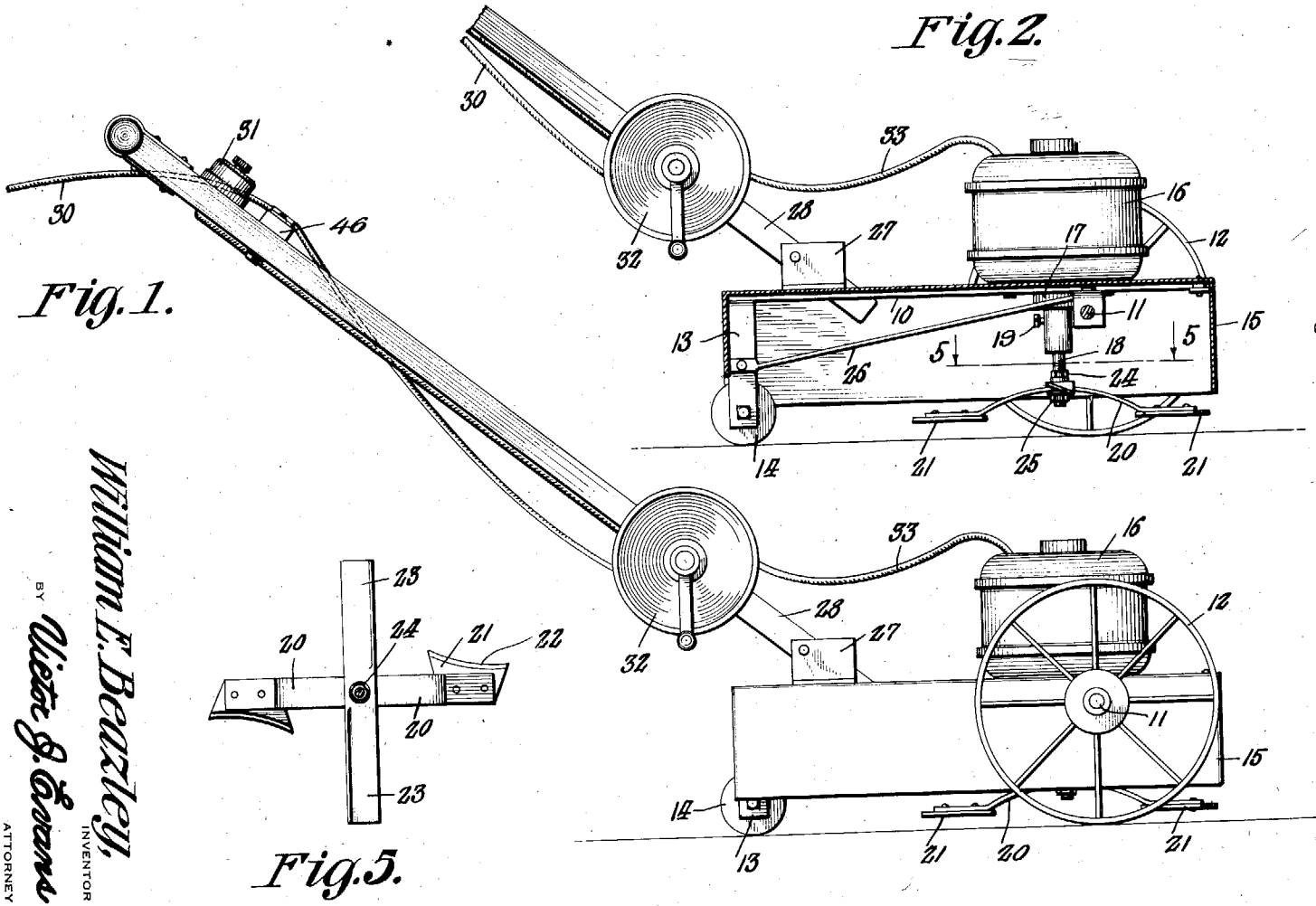
Figure 1 is a side elevation of a lawn mower constructed in accordance with the invention.
Figure 2 is a longitudinal sectional view.
Figure 5 is a detail section on the line 5—5 of Figure 2.
Figure 3:
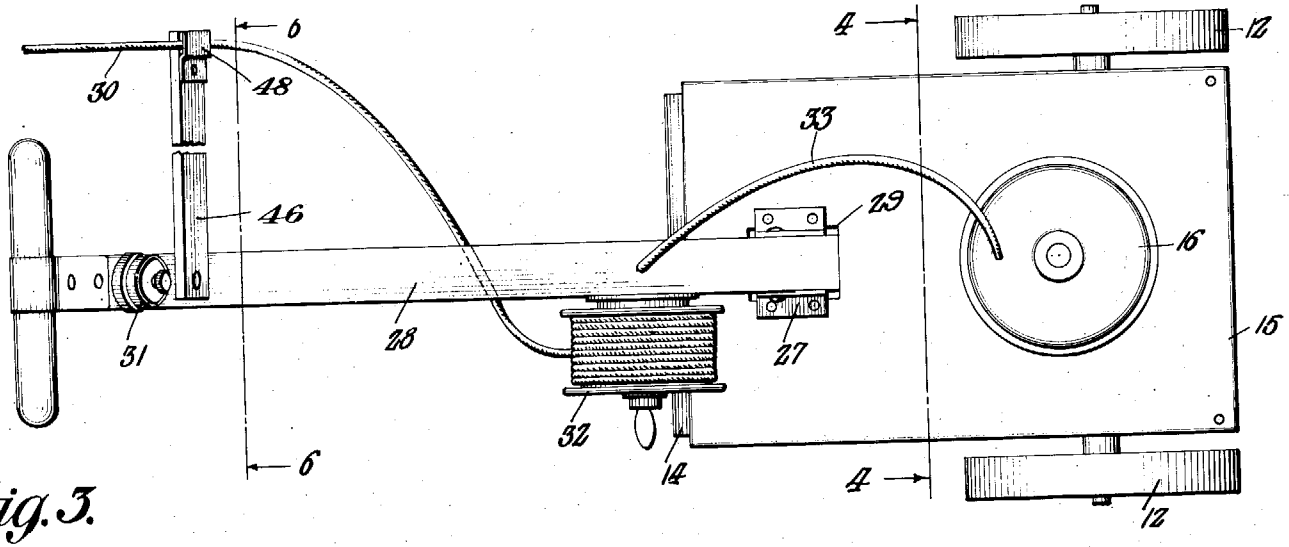
Figure 3 is a top plan view.
Figure 4:
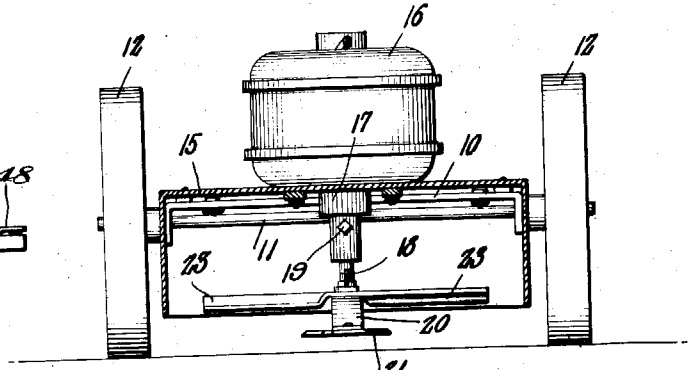
Figure 4 is a section on the line 4—4 of Figure 3.
Figure 6:
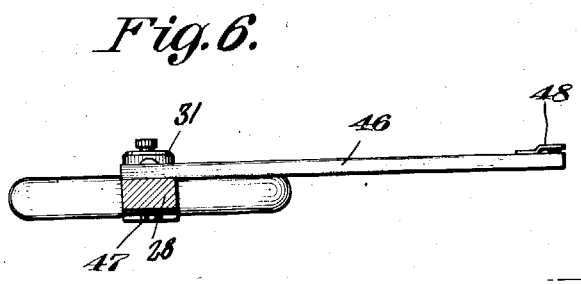
Figure 6 is a section on the line 6—6 of Figure 3.

Referring to the drawings in detail wherein like characters of reference denote corresponding parts, the mower as shown comprises a frame 10 which is mounted upon an axle 11, and this axle is supported by wheels 12, so that the frame 10 will be wheel supported. The axle 11 is located adjacent one end of the frame, while the opposite end of the frame includes depending arms 13 between which is mounted a roller 14. This roller is designed for the purpose of rolling and leveling the lawn and has added thereto the weight of the mower and the mower operating means.

The frame 10 is enclosed within a housing 15 and mounted upon this housing is an electric motor 16. The shaft of this motor extends downward within the housing through a suitable bearing 17 and this shaft is hollow and has secured therein an extension 18. The shaft extension 18 is held in place by a binding screw 19.

Mounted upon the extension 18 of the motor shaft are oppositely extending arms 20. These arms have secured to their outer ends cutting blades 21 which are horizontally disposed and which have their cutting edges curved as at 22.

It will be apparent that when the motor is operated the arms 20 will be rotated so that the blades will be operated to cut the grass or other vegetation. Due to the curved cutting edges of the blades a shearing action will be provided.

Also extending from the shaft extension 18 are oppositely disposed fan blades 23. These blades are mounted on a plane above the cutting blades 21 and provide suction means to draw the grass blades or other vegetation upward so as to hold the same erect and materially assist in the cutting operation. The grass will thus be cut to a uniform height instead of being pushed down and passed over by the blades 21. As the fan blades 23 are within the housing 15, an effective suction will be provided for raising the grass.

The blades 20 and 23 may be vertically adjusted upon the shaft extension 18 through the medium of adjusting nuts 24 and 25. The arms 13 between which the roller 14 is mounted are connected with the axle 11 by means of brace rods 26.

Pivotally mounted upon the housing 15 between spaced ears 27 is a handle 28. This handle extends downward through a slot 29 provided in the housing so that it may be tilted upward if desired.

In order to supply current for the motor there is provided a cable 30 which may be connected with a suitable source of current. This cable is connected with a controlling switch 31 which is mounted upon the handle 28 and is wound upon a reel 32 so as to permit the mower to be moved over a relatively large area. Suitable connection 33 is provided between the reel and the motor 16.

If desired, the mower may be operated through the medium of an internal combustion engine as shown at 34 in Figures 7 and 8 of the drawings. This engine is mounted in a saddle or frame 35 which rises from the housing 15 and the power shaft of the engine drives a vertically disposed shaft 36 through the medium of gears 37. The arms 20 and 23 are mounted upon this shaft 36.

The fly wheel of the engine is indicated at 38 while the carburetor is shown at 39 and fuel from this carburetor is supplied from a tank 40 which is mounted upon the handle 28, a fuel supply pipe 41 being provided for this purpose.

A suitable battery is contained within a battery box 42 which is also mounted upon the handle and current is supplied to the ignition device 43 of the engine through a cable 44. A switch 45 mounted upon the handle 28 controls the ignition.

In the first described form of the invention where current for the operation of the mower is supplied through a cable 30, means are provided for keeping the cable out of the way of the wheels. This arm which is indicated at 46 is pivotally and adjustably secured to the handle 28 by means of a bolt 47, so that it may be swung laterally to either side of the handle. The outer end of this arm carries a spring clip 48 which is adapted to yieldingly grip the cable 30. The cable may thus be held in position at either side of the handle 28 to prevent entanglement with the wheels of the mower and to clear shrubs, trees and other obstructions.

The invention is susceptible of various changes in its form, proportions and minor details of construction and the right is herein reserved to make such changes as properly fall within the scope of the appended claims.

The invention claimed is;

1. A power operated lawn mower comprising a portable carriage, a power source carried by the carriage, a shaft driven by the power source and depending therefrom under the carriage, oppositely disposed and downwardly curved arms having the inner ends thereof adjustably secured to the shaft, cutting blades secured to the arms adjacent the free ends thereof and having curved cutting edges disposed laterally of the arms, and oppositely disposed fan blades adjustably secured to the shaft above the cutting blades to create a suction to the uncut grass to draw the grass into the path of rotation of the cutting blades.

2. A power operated lawn mower comprising a wheeled frame, a housing carried by said frame and having substantially imperforate top, sides and ends and an open bottom, said housing defining a confined air space, a vertical shaft extending down into said space, a motor connected to said shaft for rotating the same, blade type cutters having lateral cutting edges and carried by said shaft and disposed to rotate in a substantially horizontal path, and means rotated with said shaft and located within said housing for creating currents of air in said housing and upwardly through the path of rotation of said cutters to draw the grass up into the field of action of said cutters.

3. A power operated lawn mower comprising a wheeled frame, a housing thereon and defining a confined air space open at its bottom adjacent the ground, a vertical shaft extending down into said air space, a motor connected to said shaft for rotating the same, a blade type cutter having a lateral cutting edge carried by said shaft and disposed to rotate in a substantially horizontal path adjacent the bottom opening of the housing, and a fan blade driven by said shaft and rotatable with said cutter and having an air deflecting surface for advancing air upwardly from the ground into the region of the cutter through the bottom opening of the housing and past the path of movement of the cutter whereby to draw grass upwardly into the field of action of the cutter.

4. A mower of the character described comprising a mobile frame having a housing defining a confined air space and open at its bottom adjacent the ground, a blade type cutter supported for rotation in a horizontal path adjacent the bottom opening of the housing, means for rotating said cutter, and means rotatable with said cutter and having air deflecting surfaces for advancing air upwardly from the ground in the region of the cutter through the bottom opening of the housing and past the path of movement of said cutter whereby to draw the grass upwardly and into the field of action of the cutter.

5. A mower of the character described comprising a mobile frame having a housing defining a confined air space and open at its bottom adjacent the ground, a blade type cutter supported for rotation in a horizontal path adjacent the bottom opening of the housing, means for rotating said cutter, a fan blade disposed adjacent the bottom opening of the housing and rotatable with said cutter about a vertical axis for advancing air upwardly from the ground in the region of the cutter through the bottom opening of the housing and past the path of movement of said cutter whereby to draw the grass upwardly and into the field of action of the cutter.

6. A power operated lawn mower comprising a mobile carriage having a housing defining a confined air space and open at its bottom adjacent the ground, a power source carried by the carriage, a shaft driven by the power source and depending therefrom into the housing, a horizontally disposed cutting blade secured to the shaft and rotated thereby, said cutting blade having a cutting edge sloping laterally whereby to effect the cutting of the grass with a sweeping action, and means rotatable with said cutting blade and having air deflecting surfaces for advancing air upwardly from the ground in the region of the cutting blade and past the path of movement thereof whereby to draw the grass upwardly and into the field of action of the cutter.

7. A mower of the character described comprising a mobile frame, a housing thereon defining an air space and open at its bottom adjacent the ground, a vertical shaft extending down into said space, a motor connected to said shaft for rotating the same, a horizontally disposed double bladed cutter secured to said shaft and rotated thereby adjacent the bottom opening of the housing, said cutter having cutting edges sloping laterally whereby to effect cutting of the grass with a sweeping action, and means rotatable with said cutter for advancing air upwardly from the ground in the region of the cutter through the bottom opening of the housing and past the path of movement of said cutter whereby to draw grass upwardly and into the field of action of the cutter.

WILLIAM E. BEAZLEY.